United States Patent

Uekusa et al.

[11] Patent Number: 5,231,451
[45] Date of Patent: Jul. 27, 1993

[54] METHOD OF RECORDING INFORMATION ONTO A PHOTOGRAPHIC FILM AND APPARATUS THEREFOR

[75] Inventors: Tadashi Uekusa; Hiroshi Murakami, both of Kanagawa, Japan

[73] Assignee: Fuji Photo Film Co., Ltd., Kanagawa, Japan

[21] Appl. No.: 755,382

[22] Filed: Sep. 5, 1991

[30] Foreign Application Priority Data

Sep. 12, 1990 [JP] Japan .................................. 2-241900
Sep. 14, 1990 [JP] Japan .................................. 2-244852

[51] Int. Cl.⁵ .................................................. G03B 29/00
[52] U.S. Cl. ........................................ 355/29; 355/40; 352/5; 352/27; 352/92
[58] Field of Search ................. 355/29, 40; 352/5, 27, 352/92

[56] References Cited

U.S. PATENT DOCUMENTS

| | | | |
|---|---|---|---|
| 3,591,266 | 7/1971 | Ried | 352/27 |
| 3,820,881 | 6/1974 | Friesen | 352/5 |
| 3,907,411 | 9/1975 | Albrecht | 352/5 |
| 4,208,108 | 6/1980 | Amikura et al. | 352/27 |
| 4,881,090 | 11/1989 | Signoretto | 355/40 |
| 4,965,626 | 10/1990 | Robison et al. | 355/40 |
| 5,043,758 | 8/1991 | Nealon | 355/40 |

*Primary Examiner*—Monroe H. Hayes
*Attorney, Agent, or Firm*—Sughrue, Mion, Zinn, Macpeak & Seas

[57] ABSTRACT

A method of recording information onto a photographic film provided with a magnetic recording layer comprises steps of reading once the information recorded on a predetermined track of the magnetic recording layer and recording it again onto the same track. In consequence, recording of the information can be conducted using a recording signal of high signal strength to improve the reliability of the information.

27 Claims, 8 Drawing Sheets

METHOD OF RECORDING INFORMATION ONTO A PHOTOGRAPHIC FILM AND APPARATUS THEREFOR

BACKGROUND OF THE INVENTION a) Field of the Invention

The present invention relates to a method of recording information recording on a magnetic recording layer of a photographic film and an apparatus therefor.

b) Description of the Related Art

It has been proposed to magnetically record information for specifying a negative film and the information for specifying an image printed thereon by applying a transparent magnetic material onto a photographic film, in this case, the negative film. According to this method, since the information can be stored so as to correspond to the image frame, the problem associated with retrieving the information can be eliminated, and the exposure and the like can be stored for each image frame when the image is printed onto the photographic paper. As a result, when the film is reordered, if this recorded exposure and the like are read, it is possible to print the image under the same conditions. In addition, when the negative film is loaded into the camera for photographing, the photographing condition and the like may be recorded by means of a recording head provided in the camera so as to serve as reference data for carrying out the printing operation.

However, if the recording condition is bad, in particular, as when the information is recorded for the camera, since the speed at which the negative film is fed by the camera is low, the amount of information to be recorded cannot be increased. In addition, since the capacity of battery, which is the driving source for feeding the negative film, is limited, the strength of the recording signal cannot be increased. Accordingly, the camera is susceptible to the effect from the external magnetic field and part or all of the information is lost, which is inferior in the point of the reliability.

In view of the foregoing, an object of the present invention is to achieve a method and apparatus for recording information onto a photographic film which allows the information to be magnetically recorded using a recording signal with high signal strength to improve the reliability.

SUMMARY OF THE INVENTION

According to the present invention, there is provided a method of recording information onto the photographic film provided with a magnetic recording layer, characterized in that the information recorded on a predetermined track of the magnetic recording layer is read once again onto to store the same track.

According to the above-described arrangement, since the information recorded once on the predetermined track is read to be recorded again, the information with low signal amplitude can be turned into one with high signal amplitude to improve the reliability of the information.

A specific embodiment of the present invention is the method of recording information onto the photographic film provided with the magnetic recording layer, characterized in that the information recorded on the predetermined track of the magnetic recording layer is read once to store again onto another track different from the preceding predetermined track.

According to the above-described arrangement, since the information is recorded again onto another track other than the original track, previous information can be held as it is, and it is possible to make the cause of elimination of the information by matching them.

Another embodiment of the present invention is characterized in that the above-described rerecording is carried out prior to printing of the image.

According to the above-described arrangement, since the rerecording is carried out prior to the printing of the image, it cannot suffer a magnetic effect resulting from a solenoid, which is used to fix the film to the printing position.

A still another embodiment of the present invention is characterized in that the rerecording is carried out after the image is printed.

According to the above-described arrangement, since the rerecording is carried out after the image is printed, additional information such as the exposure condition or the like selected during printing can be added.

A further embodiment the present invention is characterized in that, using a photographic film having a rewritable information recording means, in which an independent record is held for each frame, a series of frame information is merged to record onto a predetermined region of the original film.

In addition, an apparatus for recording information onto the photographic film, which is a specific embodiment of the present invention, comprises a read means for reading information from the above-described information recording means for a photographic film, in which an independent record is held for each frame, and a merging means for merging the read information for a plurality of continuous frames into a single block and a write means for writing the merged information onto a predetermined region of the same film for recording.

According to the above-described two embodiments of the present invention, the photographic film holds the independent information for each frame within the rewritable information recording means, and the information for the plurality of continuous frames is merged to record onto the predetermined position of the same film. As described above, since the information for the plurality of continuous frames is merged, i.e., reedited to store onto the predetermined region of the same film, when the film is cut off into pieces of negative film, the recording position can be provided at a position spaced apart from both ends of the piece, so that the film tip end cannot abut against the read head and the information can be reliably read from the negative film piece.

In addition, when the information is written by the write means, since it is written based on a write signal with high signal strength, highly reliable information can be stored into the information recording means.

If the information recorded onto a specified number of frames is read and the film is cut into this number of frames, then it is preferable to record the information onto a predetermined region of the cut photographic film except for its both ends.

As described above, according to the method and apparatus according to the present invention, it is possible to magnetically record the information using the recording signal of high strength so that its reliability may be improved.

DETAILED DESCRIPTION OF THE PREFERRED EMBODIMENTS

Figure 1:
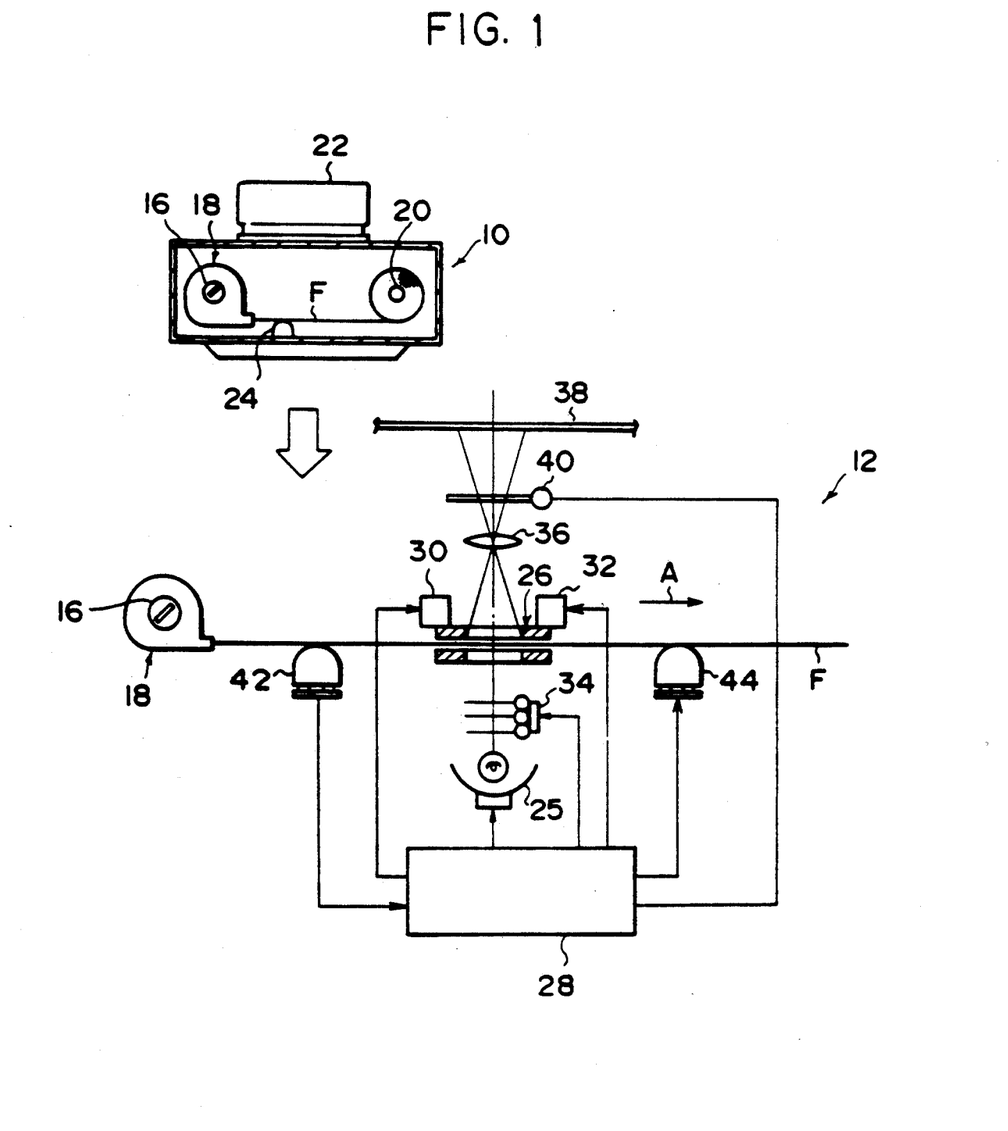
FIG. 1 is a schematic view of an arrangement of a first embodiment for recording information according to the present invention.

In FIG. 1, a camera 10 and an apparatus 12 for printing the picture according to the present invention are illustrated. In the camera 10, on its one side (left side of FIG. 1), a cartridge 18 which winds the negative film F about a spool 16 for recording is loaded. On the other side of the camera 10, a spool 20 is disposed where the tip end of the film F is engaged and the film F is wound frame by frame for each photographing operation.

Figure 3:
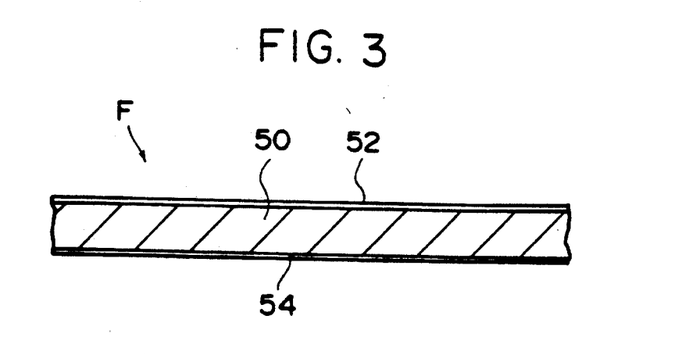
FIG. 3 is a cross-sectional view of a negative film used in the first embodiment of the invention.
Figure 4:
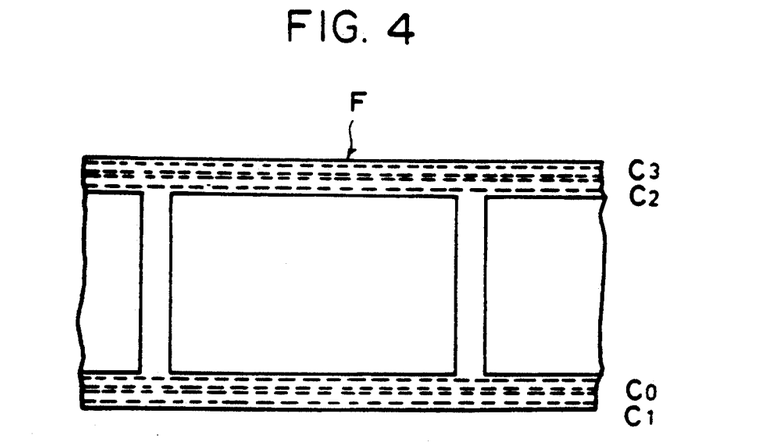
FIG. 4 is a front view of the negative film used in the first embodiment.

As shown in FIG. 3, in the negative film F, an emulsion layer 52 is provided on the upper surface of a transparent base 50 of FIG. 3 so that the image is exposed and recorded thereon. In addition, on the lower surface of the transparent base 50 of FIG. 3, a magnetic recording layer 54 applied with a transparent magnetic layer is provided. As shown in FIG. 4, in this magnetic recording layer 54, a plurality of tracks C0 to C3 is each formed outside of the image of the negative film F so as to continuously run in the longitudinal direction of the negative film F, so that the film type, user identity and the like may be recorded by means of a recording head 24, which will be described later (see FIG. 1).

Meanwhile, in the camera 10, the recording head 24 is provided corresponding on the magnetic recording layer 54 of the negative film F, and when the negative film F is fed by means of the above-described driving means, a predetermined information associated with each frame based on the exposed and recorded image of the corresponding frame is recorded onto either one of the tracks C0 to C3.

After negative film which has been photographed, after the film is wound back into the cartridge 18 again, and the cartridge withdraw from the camera 10 to be disposed to a predetermined position of the picture printing apparatus 12.

In the picture printing apparatus 12, a negative carrier 26 is disposed on the optical axis of a light source 25, which is illuminated during printing. At the negative carrier 26, a pair of driving rollers (not shown), which are rotated by the driving force of a driving portion 30 connected to a control unit 28, are disposed so that the negative film F is transported in the direction of arrow A. In addition, a solenoid 32 is provided to pinch and fix the negative film F to the printing position in accordance with the signal from the control unit 28.

Interposed between the light source 25 and the negative carrier 26 is a filter unit 34 provided with each of the C, M and Y filters, so that it may emerge on the optical axis according to the exposure of each color.

The light beam which passes through the negative film F is illuminated or photographic paper 38 via a lens 36 so that the image is printed onto the photographic paper 38. A shutter 40 is interposed between the photographic paper 38 and the lens 36 so that it is retracted from the optical axis during exposure in accordance with the signal from the control unit 28.

Upstream of the feeding path of the negative film F with respect to the negative carrier 26, is disposed a read head 42 so that the recorded information is read by the recording head 24 of the camera 10. In addition, downstream of the feeding path with respect to the negative carrier 26, an erase/recording head 44 is disposed. This erase/recording head 44 may erase the information read by the read head 42, which is recorded on the track, and the information is recorded again onto the same track according to the signal from the control unit 28.

At the control unit 28, a memory (not shown) is provided for storing the information read by the read head 42.

Figure 2:
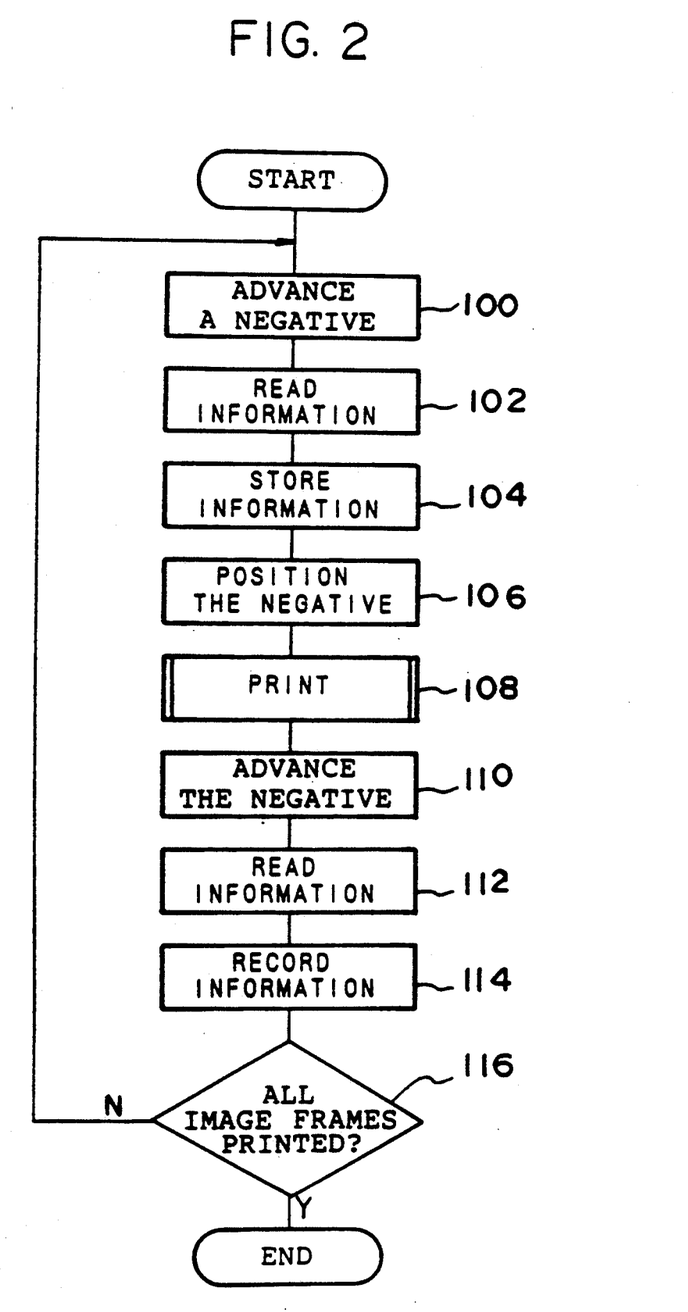
FIG. 2 is a control flowchart of the first embodiment.

The operation of this embodiment is hereinafter described with reference to a flowchart of FIG. 2. In this case, let us assume that the image is photographed by the camera 10 and, at recording head 24 of this camera 10, a cartridge 18 storing the negative film F which information is recorded on a certain track is loaded within the picture printing apparatus 12.

If, in step 100, the negative film F is advanced, then, in step 102, the information recorded on the track is read by means of the read head 42 to be stored onto the memory of the control unit 28 (step 104). In the next step 106, the negative film F is positioned and actuation of the solenoid 32 causes the negative film F to be pinched and fixed to the negative carrier 26.

In the next step 108, the printing operation is carried out and, after thereafter the procedure is shifted to step 110 to resume the advancing of the negative film F.

During this advancing, at step 112, the information stored within the memory is read from the control unit 28, and the procedure is shifted to step 114 where the information recorded on the track is erased by the erase/recording head 44 to record again onto the same track. At this time, in addition to the information recorded within the memory, the exposure condition at the time of printing may be recorded.

In the next step 116, it is determined whether all the image frames have been printed or not and, if they have not then the procedure is returned back to step 100. If all of the image frames have been recorded then the procedure is ended.

As described above, in this embodiment, since the recorded information can be recorded again by the recording head 24 of the camera 10 at the picture recording apparatus 28, information of high signal strength can be recorded with the result that the information cannot be erased by the effect from the magnetic field caused by the solenoid 32 allowing the information to be protected and the reliability to be improved.

Incidentally, although, in this embodiment, the information is recorded again on the same track, the information recorded by the recording head 24 of the camera 10 may be left as it is so that it is recorded again onto another track. For example, the information recorded on the track C0 of FIG. 4 may be recorded again onto the track C1. In that case, by matching the tracks C0 and C1, the cause of the erasure of the information can be made clear.

Figure 5:
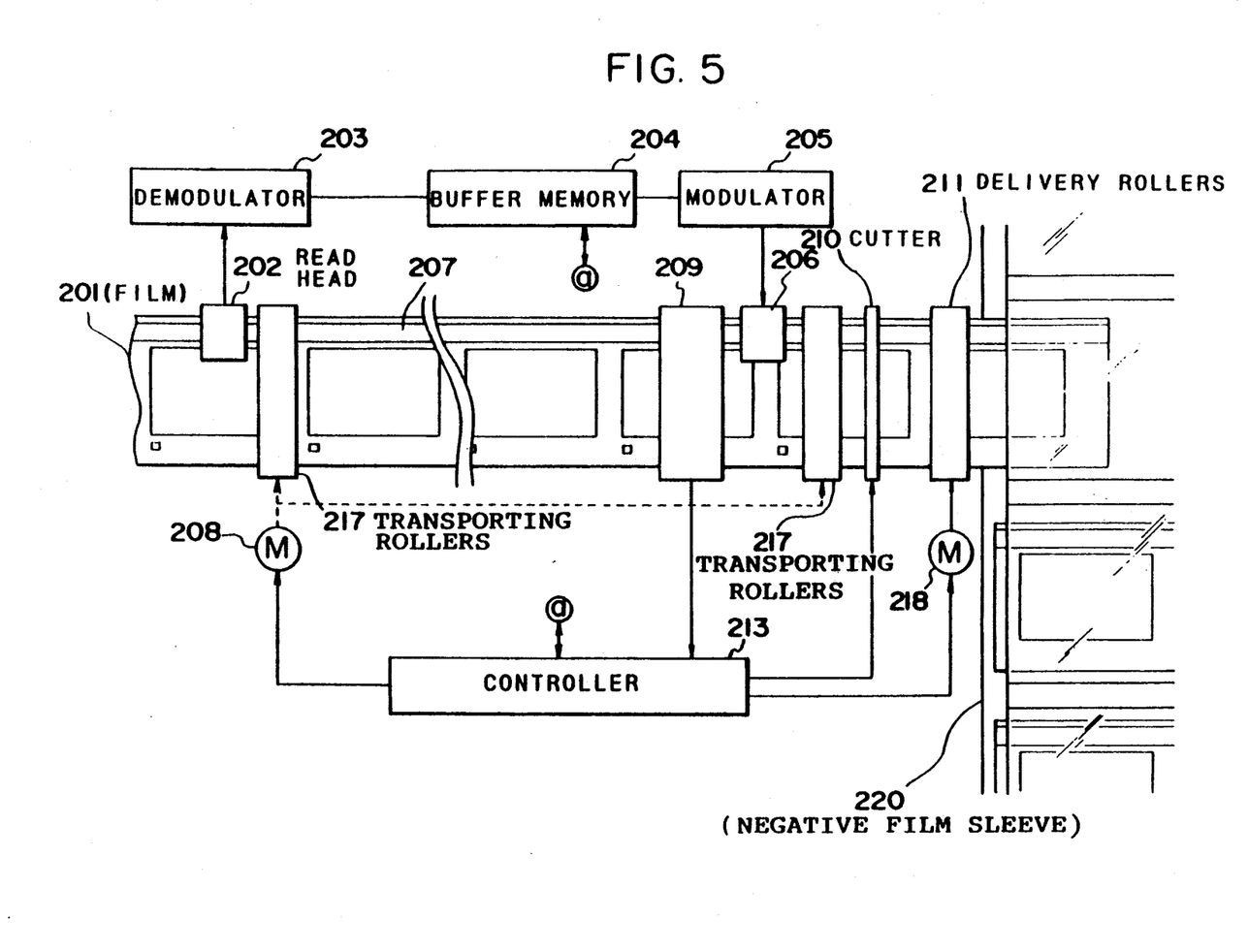
FIG. 5 is a schematic view of a film cutting machine according to a second embodiment of the invention.
Figure 6:
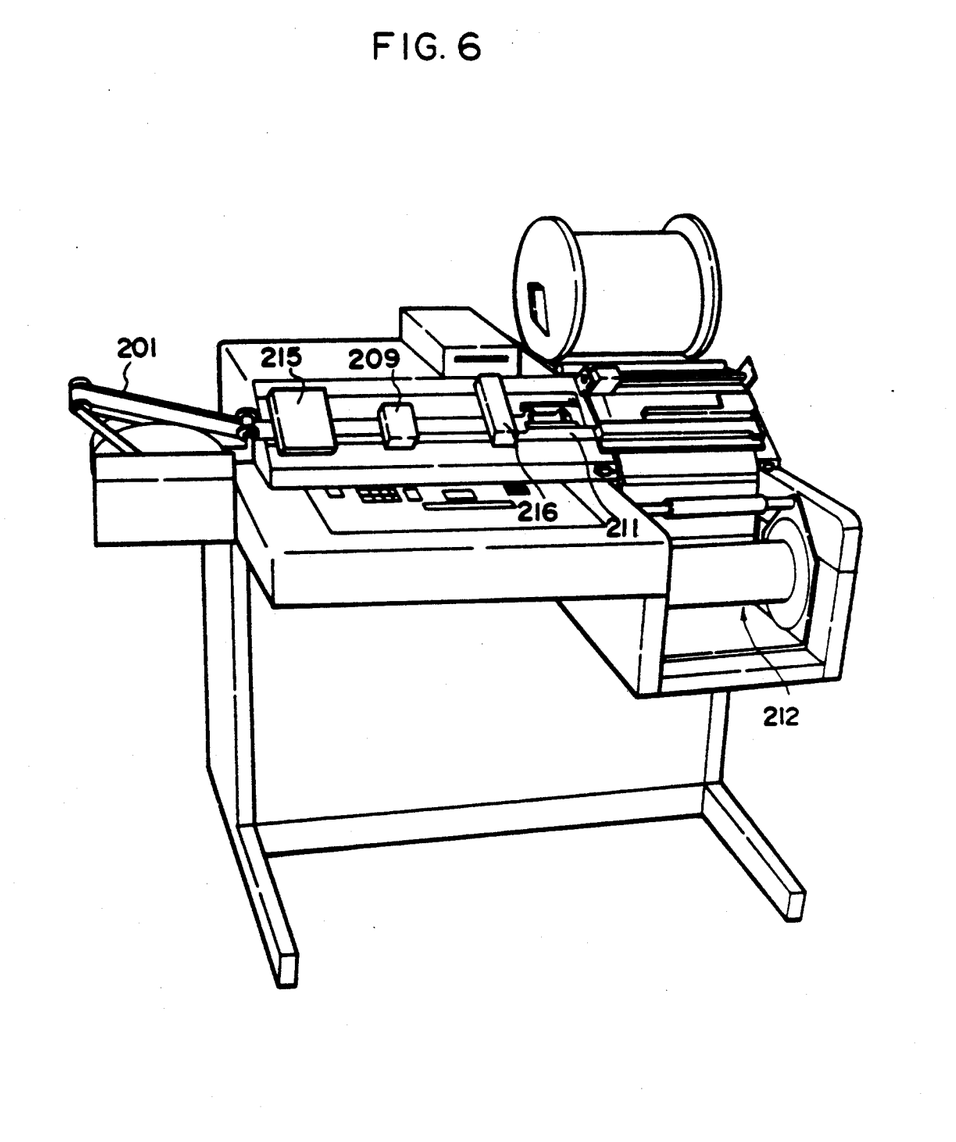
FIG. 6 is a perspective view illustrating the external view of the film cutting machine according to the second embodiment.

Next, the second embodiment of the present invention is described in detail. This embodiment relates to an application of the present invention to a film cutting machine. This machine is used when the film is cut into pieces having four or six frames, i, e, negative film pieces, and inserted into a negative film sleeve to the customer. FIG. 6 illustrates an external view of a film cutting machine according to this embodiment, and FIG. 5 illustrates a detail of a read/write portion of this film cutting machine. As shown in FIG. 6, this film cutting machine is comprised of a portion 215 for storing the read head and a peripheral circuit, a frame detection portion 209, a portion 216 for storing the write head and a peripheral circuit and a pair of delivery rollers 211 each disposed sequentially. Disposed downwardly of the downstream side of the delivery rollers 211 is a drum 212 for mounting the wound negative film sleeves.

As shown in FIG. 5, the portion 215 for storing the read head and the peripheral circuit is provided with a read head 202 for reading the information recorded on a magnetic recording layer 207 formed along the lateral edge portion of the film 201. The read head 202 is provided so as to contact this magnetic recording layer 207 and reads out the information recorded on the magnetic recording layer 207 for each frame to output to a demodulator 203. The demodulator 203 demodulates the output of the read head 202 into a digital signal, which is recorded onto a buffer memory 204. Connected to the buffer memory 204 are a modulator 205 and a controller 213. The modulator 205 converts the digital information recorded on the buffer memory 204 into a recording system on the film, and the converted signal is output to the write head 206. The write head 206 records the information from the modulator 205 onto the magnetic recording layer 207. The recording position may be determined independently of the frame position so that the recording start and recording end positions may be sufficiently distant from the both ends of the negative film piece for each unit of cutting of the negative film. As described above, since the information may be recorded at a position sufficiently distant from both ends of the negative film piece, a need for reading the record at both ends of the film, which is the cause of the reduction of the reliability in reading the information after the film is shortened, or cut into the negative film pieces, is eliminated. In addition, since the information is distant from the cutting position, it can be written at a constant feeding speed with the result that the reduction of the recording reliability caused by the fluctuation of the feeding speed can also be prevented.

At the downstream side of the read head 202, a pair of transporting rollers 217 rotated by a feeding motor 208, a frame detection portion 209, a write head 206 and a pair of transporting rollers 217 rotated by the feeding motor 208 are sequentially disposed. At the downstream side of the transporting rollers 217, a cutter 210 is disposed, at the downstream side of which a pair of delivery rollers 211, which is rotated by a motor 218 is disposed. In addition, at the downstream side of the delivery rollers 211, a negative film sleeve 220 is disposed.

Figure 7:
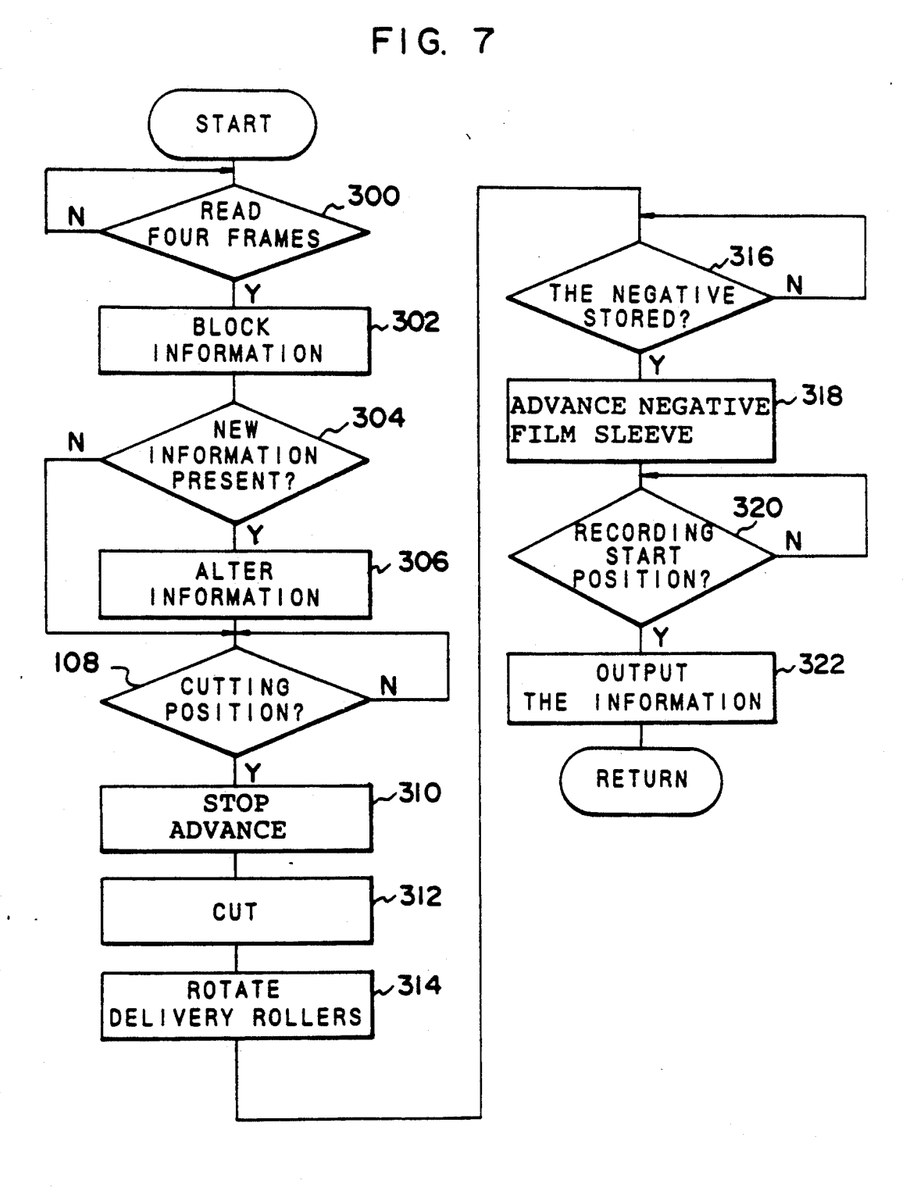
FIG. 7 is a flowchart illustrating a control routine according to the second embodiment of the invention.

The operation of this embodiment is hereinafter described with reference to a control routine of FIG. 7. In step 300, it is determined based on the information recorded in the buffer memory 209 or the detected result at the frame detection portion 209 whether the information for a predetermined number of frames, for example, four frames, which are contained within the portion of the negative film which should be cut into the negative film piece, has been read out by the read head 202 or not. If the information for the predetermined number of frames is read, then, in step 302, it is formed into a block and, in step 304, it is determined whether new information has been entered from a keyboard or not. This new information is about the exposure or the like selected during reprinting. If the new information is present, then, in step 306, the new information is added to alter the information block and, in step 308, based on the output of the frame detector 209, it is determined whether the rear end position of the negative film piece (cutting position) has reached the immediate lower position of the cutter 210 or not. If yes, then, in step 310, the feeding motor 208 and the motor 218 are stopped to stop feeding of the film 201 while the cutter 210 is controlled to cut the film 201. In the next step 314, the motor 218 is controlled to rotate the delivery rollers 211. In step 316, by determining whether the delivery rollers 211 have been rotated for a predetermined period of time or not, it is determined whether the negative film piece has been stored into the negative film sleeve or not. When it is determined that the negative film piece has been stored within the negative film sleeve or not, the negative film sleeve 212 is advanced by rotating by the width of the film 201 while the feeding motors 208 and 218 are rotated to start advance of the film 201. In the next step 320, it is determined whether the recording start position, which is sufficiently distant from the predetermined film tip end, has passed through the immediate lower position of the write head 206 or not and, if yes, the buffer memory 204 is controlled to output the data block to start recording of the information via the modulator 205 by the write head 206. Although the recording of the information is completed with the film 201 advanced a predetermined amount, since the length of the information to be recorded corresponds to the number of frames and the information to be written is formed into a single block, namely, all of the information is merged the recording end position comes at a sufficiently distant position from the tip end side rather than the rear end of the negative film piece.

Figure 8:
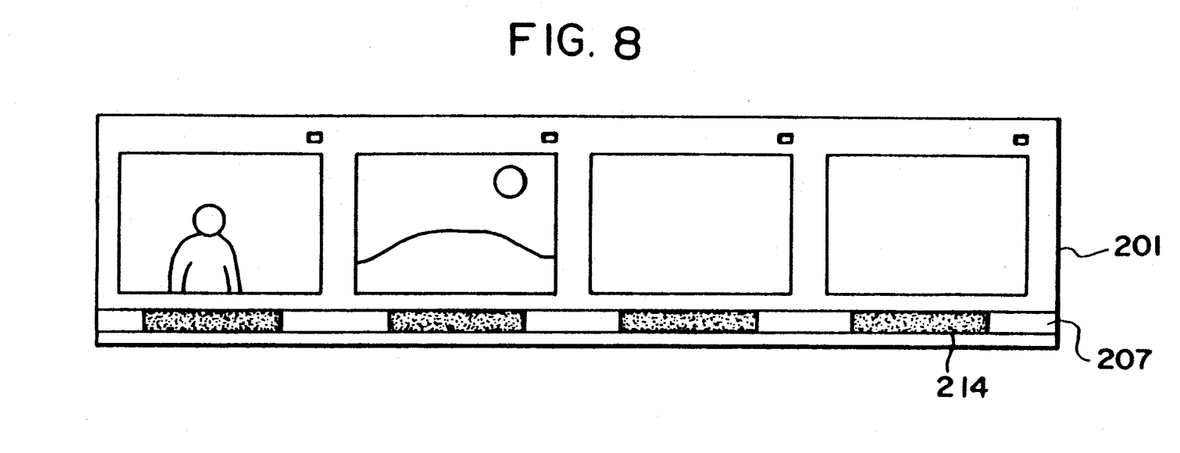
FIG. 8 is an explanatory view illustrating a conventional recording method.
Figure 9:
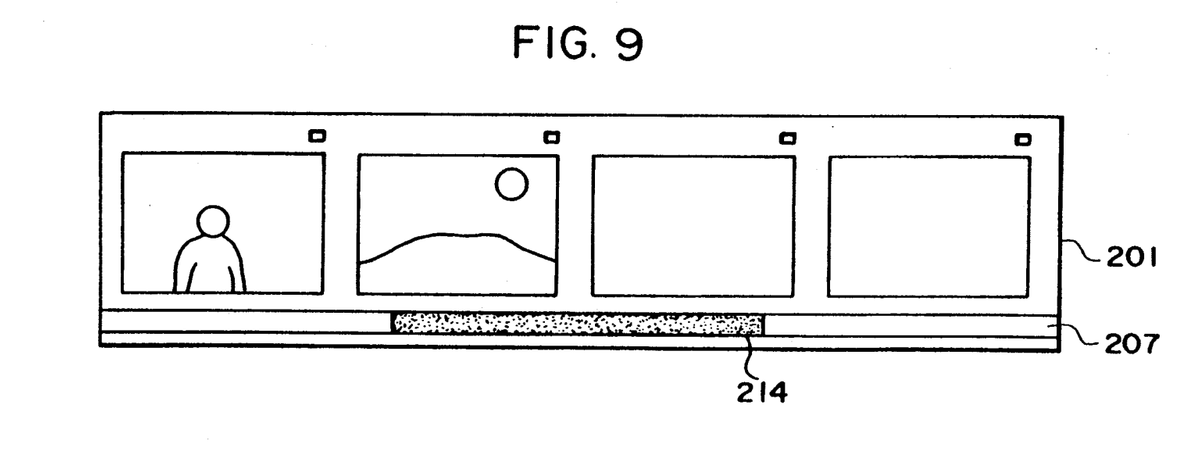
FIG. 9 is an explanatory view of a recording method according to the second embodiment.
Figure 10:
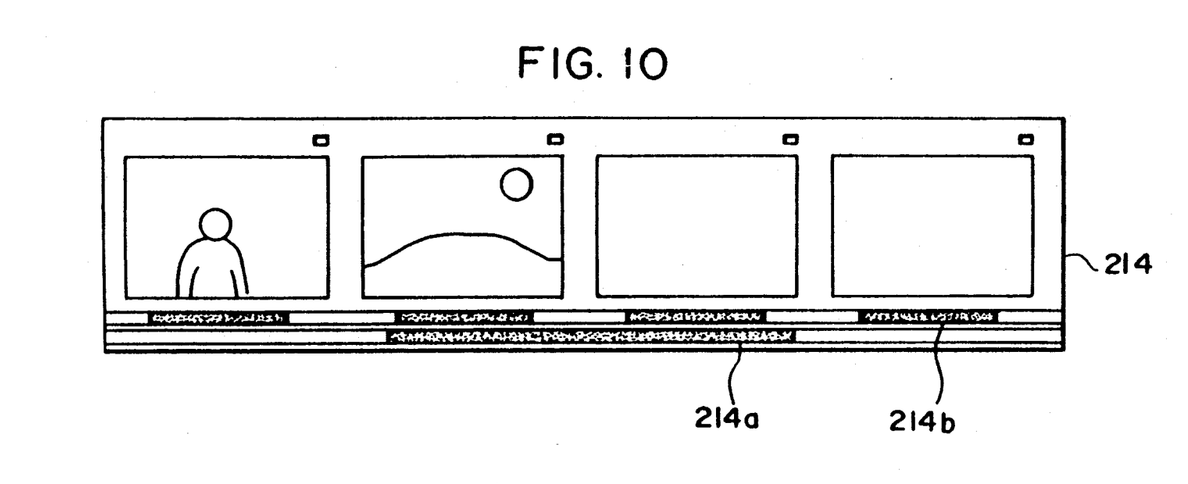
FIG. 10 is an explanatory view of a recording method when a plurality of magnetic tracks is used as a modification of the second embodiment, which is a modification of the second embodiment.
Figure 11:
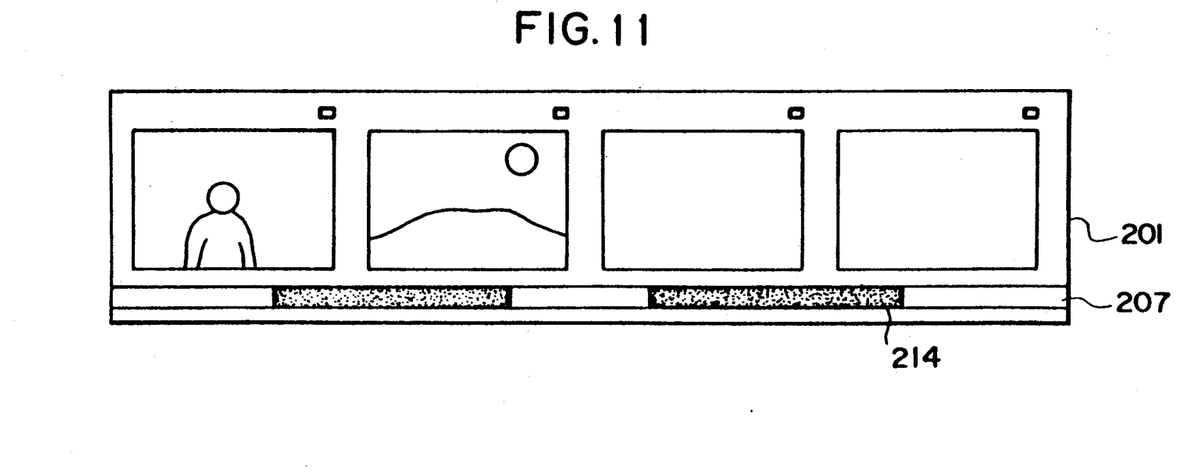
FIG. 11 is an explanatory view of a magnetic track when the information of the same content is recorded plural times, which is another modification of the second embodiment.

The magnetic track 214 to be written by the write head 206, as shown in FIG. 9, may be the same magnetic track 214a as during the photographing shown in FIG. 8 but, as shown in FIG. 10, may be another track 214b. If the recording length is sufficiently short as compared with that of the negative film piece negative, then, as shown in FIG. 11, the record of the same content may be written plural times to increase the reliability of the data. In the camera 10, information can only be recorded individually for each frame of the negative film. It is impossible for information regarding several frames to be recorded simultaneously within the camera 10. Therefore, it is desirable to merge the separate sets of information per frame into one block of information so that when the film is reprinted, there is no need to readout, at each frame, each set of information corresponding respectively to each frame, i.e., so that information for several frames can be read in a single process. If the negative film is not cut into pieces, the single block of information, i.e., the merged information, is recorded at either the beginning end or trailing end of the negative film.

Incidentally, the cutting unit of this embodiment may be any number of frames, and the information recording means is not restricted to the magnetic track, but may be the optical or mechanical recording means.

As described above, according to the second embodiment of the present invention, the frame information is turned into a single continuous record to eliminate the need for reading the information at the end portion, which is the cause of reduction of the reliability. In addition, since the data is written at a constant speed, it is stabilized. In addition, since the gap between frames as occurs as the information is recorded becomes unnecessary, the storage capacity can be increased without using any high density recording method in the above embodiment the present invention is applied to the negative film but this invention can also be applied to a photographic film such as a positive film.

What is claimed is:

1. A method of rerecording information onto a photographic film provided with a magnetic recording layer in which said information is initially recorded with a first signal strength, said method comprising the steps of:
    reading said information recorded on a predetermined track of said magnetic recording layer prior to printing of said film; and
    rerecording said read information onto the same track after said film is printed with a second signal strength greater than said first signal strength.

2. Method of recording information as set forth in claim 1 wherein a plurality of image frames are recorded independently in the longitudinal direction of said photographic film and said information is independently recorded in plural number corresponding to each of said plurality of image frames, said rerecording is carried out by merging a plurality of continuous information.

3. Method of recording information as set forth in claim 1 wherein said merged information is recorded again to a plurality of positions.

4. A method of rerecording information onto a photographic film provided with a magnetic recording layer having a plurality of tracks, said information being initially recorded with a first signal strength on a predetermined track, said method comprising the steps of:
    reading said information recorded on said predetermined track of said magnetic recording layer prior to printing said film; and
    rerecording said read information onto another track different from said predetermined track after said film has been printed, with a second signal strength greater than said first signal strength.

5. Method of recording information as set forth in claim 4 wherein a plurality of image frames is independently recorded in the longitudinal direction of said photographic film, said information is independently recorded in plural number corresponding to each of said plurality of image frames and said rerecording is conducted by merging a plurality of continuous information.

6. Method of recording information as set forth in claim 5 wherein said merged information is recorded again at a plurality of positions.

7. Method of recording information comprising steps of:
    reading the information corresponding to a plurality of continuous photographed frames from a photographic film having a rewritable information recording means, in which the information corresponding to said frame is independently recorded on said information recording means for each frame;
    merging said read information; and
    recording at least the information containing said merged information onto a predetermined region of said information recording means.

8. Method of recording information as set forth in claim 7 wherein said predetermined region is provided in plural number and said merged information is recorded onto said plurality of positions.

9. Method of recording information as set forth in claim 7 wherein said information recording means has a plurality of recording tracks, and the recording track on which the information corresponding to said frame is different from the recording track for merging and recording said read information.

10. Method of recording information as set forth in claim 7 wherein a step is added for adding new information to the merged information between said merging step and said recording step.

11. Method of recording information as set forth in claim 7 further including a step for cutting said photographic film into a piece comprising said plurality of continuous frames.

12. Method of recording information as set forth in claim 11 wherein said predetermined region is the substantially central portion of said piece as viewed in the longitudinal direction.

13. Apparatus for recording information onto a photographic film comprising:
    reading means for reading information from said information recording means of a film, said film having a rewritable information recording means and holding independent information for each frame within said information recording means;
    merging means for merging the information read by said reading means into a single block for each plurality of continuous frames; and
    writing means for writing said merged information into a predetermined region of said information recording means.

14. Apparatus for recording information as set forth in claim 13 wherein said information recording means is the magnetic recording layer.

15. Apparatus for recording information as set forth in claim 14 wherein said magnetic recording layer is provided with a plurality of recording tracks and the recording track holding the independent information for each frame is different from the recording track onto which the information merged by said merging means is written.

16. Apparatus for recording information as set forth in claim 13 further comprising a means for adding new information to said information merged said the merging means.

17. A method of rerecording information onto a photographic film provided with an information recording layer in which said information is initially rewritably recorded, said method comprising the steps of:
  reading said information, corresponding to a plurality of continuous photographed frames, from said photographic film;
  merging a plurality of information portions which are read in said reading step into a single information block; and
  rerecording at least said merged information onto a predetermined region of said information recording layer of said photographic film.

18. A method of rerecording information onto a photographic film as set forth in claim 17, wherein said predetermined region for rerecording said merged information is provided at at least one of a beginning end and a tail end of the photographic film.

19. A method of rerecording information onto a photographic film as set forth in claim 17, wherein information portions corresponding to each frame of said photographic film are independently rerecorded on said information recording layer for each frame in addition to recording said single block.

20. An apparatus for rerecording information onto a photographic film which has an information recording layer, comprising:
  reading means for reading information corresponding to a plurality of continuous photographed frames, which information is recorded on said information recording layer of said photographic film;
  merging means for merging a plurality of portions of said information into a single block of information; and
  rerecording means for rerecording said single block of said merged information into a predetermined region of said information recording layer of said photographic film.

21. An apparatus for rerecording information onto a photographic film as set forth in claim 20, wherein said predetermined region for rerecording said merged information is provided at at least one of a beginning end and a tail end of the photographic film.

22. An apparatus for rerecording information onto a photographic film as set forth in claim 20, wherein an information portion corresponding to each frame is independently recorded for each frame on said information recording layer.

23. An apparatus for rerecording information onto a photographic film as set forth in claim 20, wherein said information recording layer is comprised of a magnetic recording layer.

24. An apparatus for rerecording information onto a photographic film as set forth in claim 23, wherein said magnetic recording layer is provided with a plurality of recording tracks, and each of said recording tracks which records an information portion for each frame is different from the recording track onto which said single block of said information merged by said merging means is recorded.

25. An apparatus for rerecording information onto a photographic film as set forth in claim 20, further comprising means for recording further information in addition to said single block of said information which is merged by said merging means.

26. A method of rerecording information onto a photographic film provided with a magnetic recording layer in which said information is initially recorded with a first signal strength, said method comprising the steps of:
  reading said information recorded on a predetermined track of said magnetic recording layer prior to printing of said film; and
  rerecording said read information onto the same track with a second signal strength greater than said first signal strength.

27. A method of rerecording information onto a photographic film provided with a magnetic recording layer having a plurality of tracks, said information being initially recorded with a first signal strength on a predetermined track, said method comprising the steps of:
  reading said information recorded on said predetermined track of said magnetic recording layer prior to printing said film; and
  rerecording said read information onto another track different from said predetermined track after said film has been printed, with a second signal strength greater than said first signal strength.

* * * * *